(12) United States Patent
Thorson et al.

(10) Patent No.: US 9,283,625 B2
(45) Date of Patent: Mar. 15, 2016

(54) AUTO SIZING CHUCK

(75) Inventors: Troy C. Thorson, Waukesha, WI (US); Jeffrey Holly, West Bend, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 692 days.

(21) Appl. No.: 13/440,542

(22) Filed: Apr. 5, 2012

(65) Prior Publication Data
US 2012/0256380 A1 Oct. 11, 2012

Related U.S. Application Data

(60) Provisional application No. 61/472,057, filed on Apr. 5, 2011, provisional application No. 61/509,779, filed on Jul. 20, 2011.

(51) Int. Cl.
*B23B 31/12* (2006.01)

(52) U.S. Cl.
CPC .......... *B23B 31/1238* (2013.01); *B23B 31/123* (2013.01); *B23B 31/1215* (2013.01); *B23B 2260/136* (2013.01); *Y10T 29/49826* (2015.01); *Y10T 279/17461* (2015.01); *Y10T 279/17615* (2015.01); *Y10T 279/32* (2015.01)

(58) Field of Classification Search
CPC .............. B23B 31/123; B23B 31/1238; B23B 31/1215; B23B 31/1207
USPC ...................... 279/46.7, 60, 140, 46.1, 61–65
See application file for complete search history.

(56) References Cited

U.S. PATENT DOCUMENTS

| 246,513 | A | | 8/1881 | Ireland |
|---|---|---|---|---|
| 299,964 | A | | 6/1884 | Crary |
| 457,392 | A | * | 8/1891 | Austin ............................ 279/64 |
| 809,296 | A | | 1/1906 | Gordon |
| 2,172,070 | A | | 9/1939 | Palmgren |
| 2,822,181 | A | | 2/1958 | Sloan |
| 2,931,660 | A | | 4/1960 | Barwinkel |
| 3,229,554 | A | | 1/1966 | Haddad |
| 3,439,532 | A | | 4/1969 | Grumback et al. |

(Continued)

FOREIGN PATENT DOCUMENTS

| DE | 531920 | 8/1931 |
|---|---|---|
| DE | 6922774 | 2/1970 |

(Continued)

OTHER PUBLICATIONS

Extended European Search Report for Application No. 12767422.4 dated Aug. 19, 2014 (6 pages).

*Primary Examiner* — Eric A Gates
*Assistant Examiner* — Chwen-Wei Su
(74) *Attorney, Agent, or Firm* — Michael Best & Friedrich LLP

(57) ABSTRACT

A chuck includes a chuck body extending along a longitudinal axis, the chuck body including a plurality of slots each arranged at an oblique angle with respect to the longitudinal axis. A plurality of jaws each includes a first engagement portion, a jaw end, and a drive end. Each of the jaws is disposed within one of the plurality of slots and is movable between a close position and an open position. A biasing member is coupled to the plurality of jaws and is operable to bias the plurality of jaws toward the close position and a rotating assembly is selectively engageable with the plurality of jaws such that when engaged, the plurality of jaws are movable in response to rotation of the rotating assembly.

17 Claims, 8 Drawing Sheets

(56) References Cited

U.S. PATENT DOCUMENTS

| | | |
|---|---|---|
| 3,647,231 A | 3/1972 | Schafer |
| 3,692,321 A | 9/1972 | Shattuck |
| 3,861,693 A | 1/1975 | Huber |
| 4,111,587 A | 9/1978 | Hatanaka |
| 4,266,789 A | 5/1981 | Wahl et al. |
| 4,277,074 A | 7/1981 | Kilberis |
| 4,284,285 A | 8/1981 | Futter |
| 4,378,714 A | 4/1983 | Colvin |
| 4,381,116 A | 4/1983 | Futter |
| 4,410,191 A | 10/1983 | James |
| 4,463,960 A | 8/1984 | Walton |
| 4,498,682 A | 2/1985 | Glore |
| 4,526,497 A | 7/1985 | Hatfield |
| 4,527,809 A | 7/1985 | Umbert |
| 4,594,036 A * | 6/1986 | Hogenhout .................. 408/240 |
| 4,648,608 A | 3/1987 | Smith |
| 4,669,932 A | 6/1987 | Hartley |
| 4,701,083 A | 10/1987 | Deutschenbaur et al. |
| 4,711,457 A | 12/1987 | Wezel |
| 4,848,779 A | 7/1989 | Wheeler et al. |
| 4,902,025 A | 2/1990 | Zimdars |
| 4,946,179 A | 8/1990 | De Bastiani et al. |
| 4,951,955 A | 8/1990 | Sakamaki |
| 4,991,859 A | 2/1991 | Rohm |
| 5,195,760 A | 3/1993 | Wheeler et al. |
| 5,407,215 A | 4/1995 | Yang |
| 5,685,549 A | 11/1997 | Yang |
| 5,820,134 A | 10/1998 | Subils Valls |
| 5,988,653 A | 11/1999 | Kuo |
| 6,196,554 B1 | 3/2001 | Gaddis et al. |
| 6,241,259 B1 | 6/2001 | Gaddis et al. |
| 6,241,260 B1 | 6/2001 | Judge et al. |
| 6,260,857 B1 | 7/2001 | Wienhold et al. |
| 6,488,287 B2 | 12/2002 | Gaddis et al. |
| 6,505,840 B2 * | 1/2003 | Huggins et al. ................. 279/61 |
| 6,536,782 B2 | 3/2003 | Rohm |
| 7,156,402 B2 | 1/2007 | Mack |
| 7,198,439 B2 | 4/2007 | Hoffmann et al. |
| 7,520,512 B2 | 4/2009 | Campbell et al. |
| 2004/0202518 A1 | 10/2004 | Yaksich et al. |
| 2004/0251641 A1 | 12/2004 | Hoffmann et al. |
| 2006/0175769 A1 | 8/2006 | Huggins et al. |
| 2006/0244224 A1 | 11/2006 | Zhou et al. |

FOREIGN PATENT DOCUMENTS

| | | |
|---|---|---|
| DE | 3114503 | 11/1982 |
| DE | 3424679 | 2/1986 |
| DE | 3434112 | 3/1986 |
| DE | 3501870 | 7/1986 |
| DE | 3700167 | 7/1987 |
| DE | 3604927 | 8/1987 |
| DE | 3610671 | 10/1987 |
| DE | 3713457 | 9/1988 |
| DE | 4218835 | 10/1992 |
| DE | 4114884 | 11/1992 |
| DE | 4209307 | 1/1993 |
| DE | 4326652 | 1/1994 |
| DE | 19549206 | 7/1997 |
| EP | 0054774 | 6/1982 |
| EP | 0178434 | 4/1986 |
| EP | 0235607 | 9/1987 |
| EP | 0316522 | 5/1989 |
| EP | 0322513 | 7/1989 |
| EP | 0450135 | 10/1991 |
| EP | 0461806 | 12/1991 |
| EP | 1380372 A1 | 1/2004 |
| FR | 959540 | 3/1950 |
| GB | 217341 | 6/1924 |
| GB | 556523 | 10/1943 |
| GB | 2065001 | 6/1981 |
| WO | WO 92/17305 | 10/1992 |
| WO | WO 96/04090 | 2/1996 |

* cited by examiner

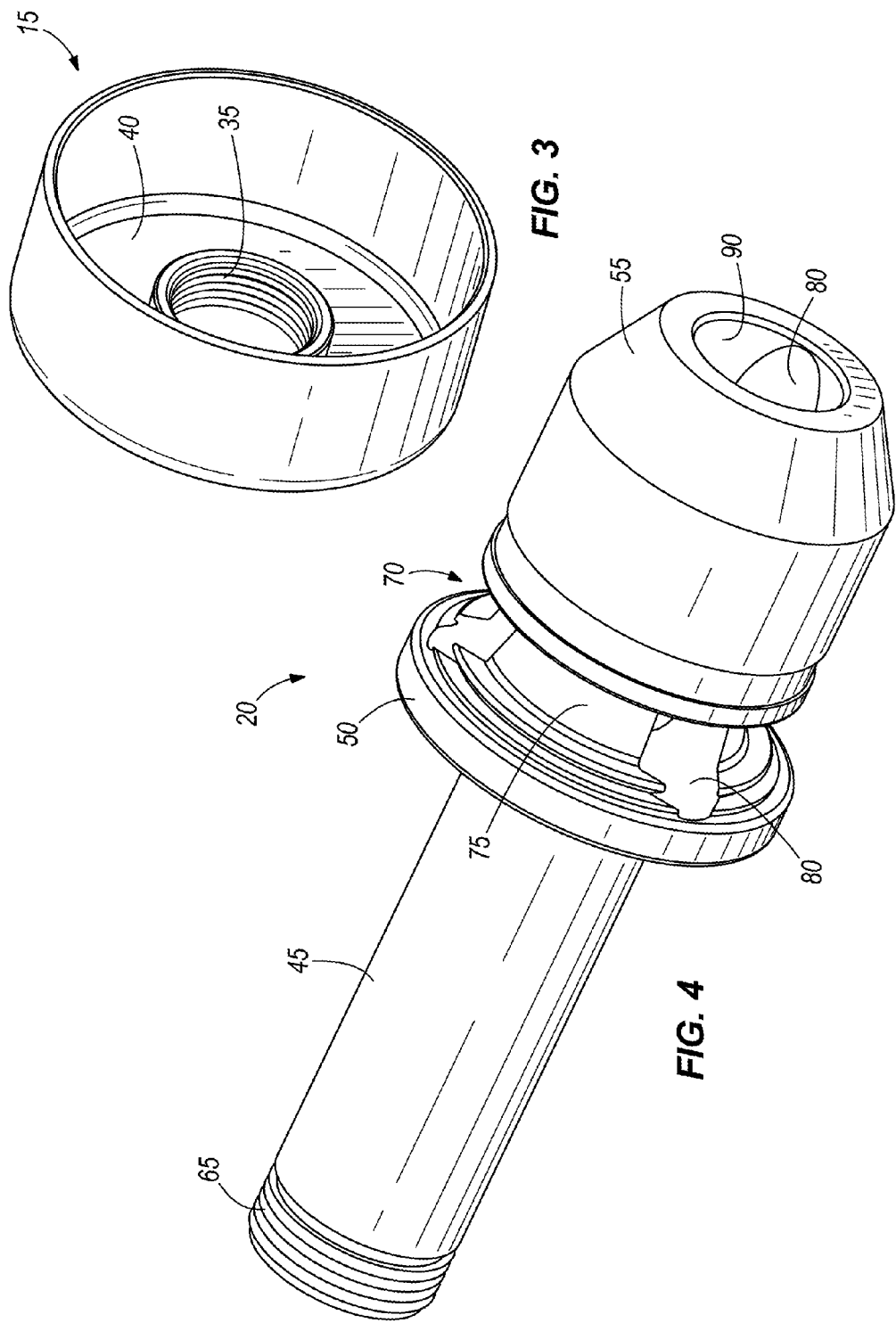

9,283,625 B2

AUTO SIZING CHUCK

RELATED APPLICATIONS

This application claims priority to U.S. Provisional Patent Application No. 61/472,057 filed on Apr. 5, 2011, the entire content of which is incorporated herein by reference. This application also claims priority to U.S. Provisional Patent Application No. 61/509,779 filed on Jul. 20, 2011, the entire content of which is incorporated herein by reference.

BACKGROUND

The present invention relates to an auto sizing chuck for use with a drill or other tool. More specifically, the invention relates to a chuck that automatically adjusts to the size of the tool inserted into the chuck.

SUMMARY

In one embodiment, the invention provides a chuck that is adjustable between a closed or minimum open position and a maximum open position without rotation of the chuck. The chuck includes a plurality of threaded jaws and a threaded rotating assembly that is selectively engageable with the jaws. When the jaws and the rotating assembly are disengaged, the jaws are free to move between the minimum open position and the maximum open position. When the jaws and the rotating assembly are engaged, the rotating assembly must be rotated to tighten the jaws.

In one construction, the invention provides a chuck for a power tool. The chuck includes a chuck body extending along a longitudinal axis, the chuck body including a plurality of slots each arranged at an oblique angle with respect to the longitudinal axis. A plurality of jaws each includes a first engagement portion, a jaw end, and a drive end. Each of the jaws is disposed within one of the plurality of slots and is movable between a close position and an open position. A biasing member is coupled to the plurality of jaws and is operable to bias the plurality of jaws toward the close position and a rotating assembly is selectively engageable with the plurality of jaws such that when engaged, the plurality of jaws are movable in response to rotation of the rotating assembly.

In another construction, the invention provides a chuck for a power tool. The chuck includes a chuck body extending along a longitudinal axis, the chuck body including a plurality of slots each arranged at an oblique angle with respect to the longitudinal axis and a plurality of jaws each including a first engagement portion, a jaw end, and a drive end, each of the jaws disposed within one of the plurality of slots and movable between a close position and an open position. A biasing member is coupled to the plurality of jaws and is operable to bias the plurality of jaws toward the close position and a rotating assembly is coupled to the chuck body and includes a second engagement portion. The rotating assembly is rotatable with respect to the chuck body between a disengaged position, an engaged position, and a tightened position, wherein the first engagement portions and the second engagement portion are disengaged when the rotating assembly is in the disengaged position such that the plurality of jaws are movable along the longitudinal axis independent of the rotating assembly and wherein the first engagement portions and the second engagement portion are engaged when the rotating assembly is in the engaged position such that the plurality of jaws are movable along the axis in response to rotation of the rotating assembly, and wherein rotation of the rotating assembly from the engaged position to the tightened position moves the plurality of jaws toward the close position.

In yet another construction, the invention provides a method of engaging a tool in a chuck. The method includes movably positioning a plurality of jaws within a chuck body, the jaws movable between a close position and an open position, disengaging a rotating assembly from the plurality of jaws, and moving the jaws to the close position in response to the disengagement of the rotating assembly from the plurality of jaws. The method also includes pushing the jaws toward the open position until the tool can be positioned within the jaws, biasing the jaws toward the close position such that the jaws lightly hold the tool in a desired position, and rotating the rotating assembly to engage the rotating assembly and the plurality of jaws. The method also includes further rotating the rotating assembly to force the jaws toward the close position to firmly hold the tool in the desired position and maintaining the position of the rotating assembly to hold the plurality of jaws in the desired position.

Other aspects of the invention will become apparent by consideration of the detailed description and accompanying drawings.

BRIEF DESCRIPTION OF THE DRAWINGS

FIG. 3 is a perspective view of a bottom cover;

FIG. 4 is a perspective view of a chuck body;

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
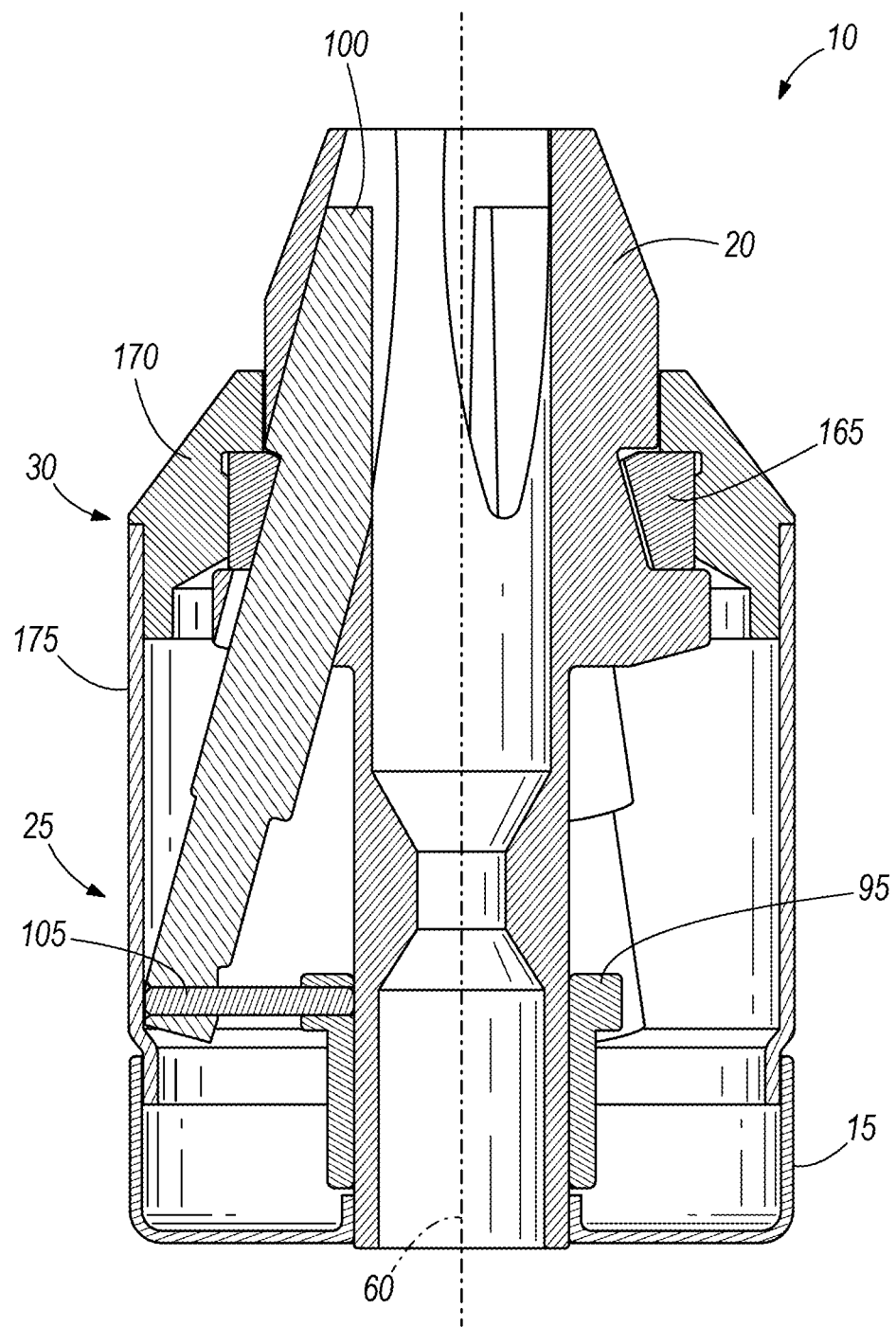
FIG. 1 is a broken away view of an auto sizing chuck in a first position.
Figure 2:
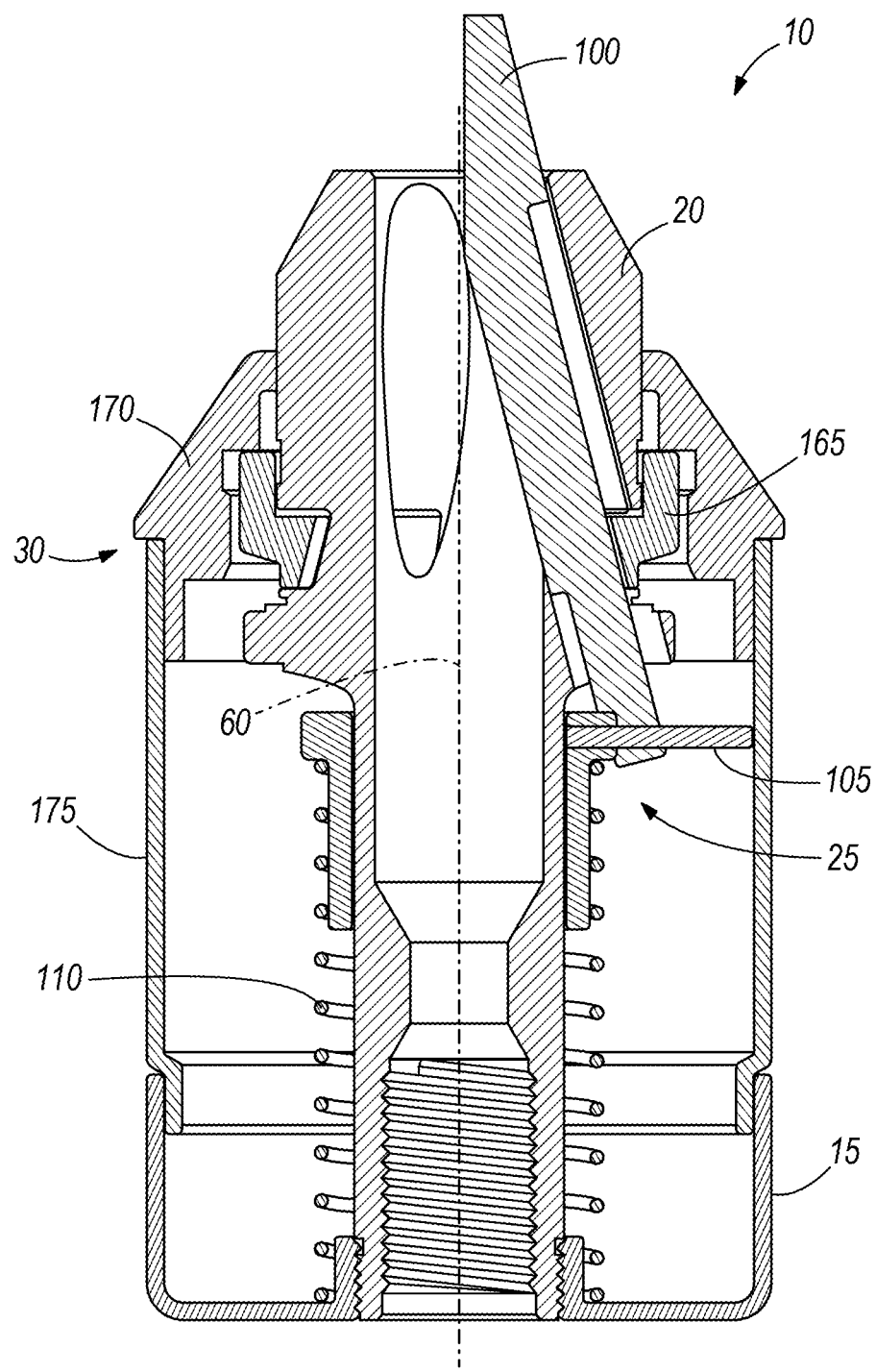
FIG. 2 is a section view of the chuck of FIG. 1 in a second position.

FIGS. 1 and 2 illustrate an auto sizing chuck 10 that is capable of quickly receiving many different tools having different diameters. The chuck 10 includes a bottom cover 15, a chuck body 20, a sliding assembly 25, and a rotating assembly 30. The bottom cover 15, illustrated in FIG. 3 includes a cup-shaped member having an aperture 35 formed in a bottommost surface 40. The aperture 35 is threaded to receive the chuck body 20 to fixedly attach the bottom cover 15 to the chuck body 20.

Figure 5:
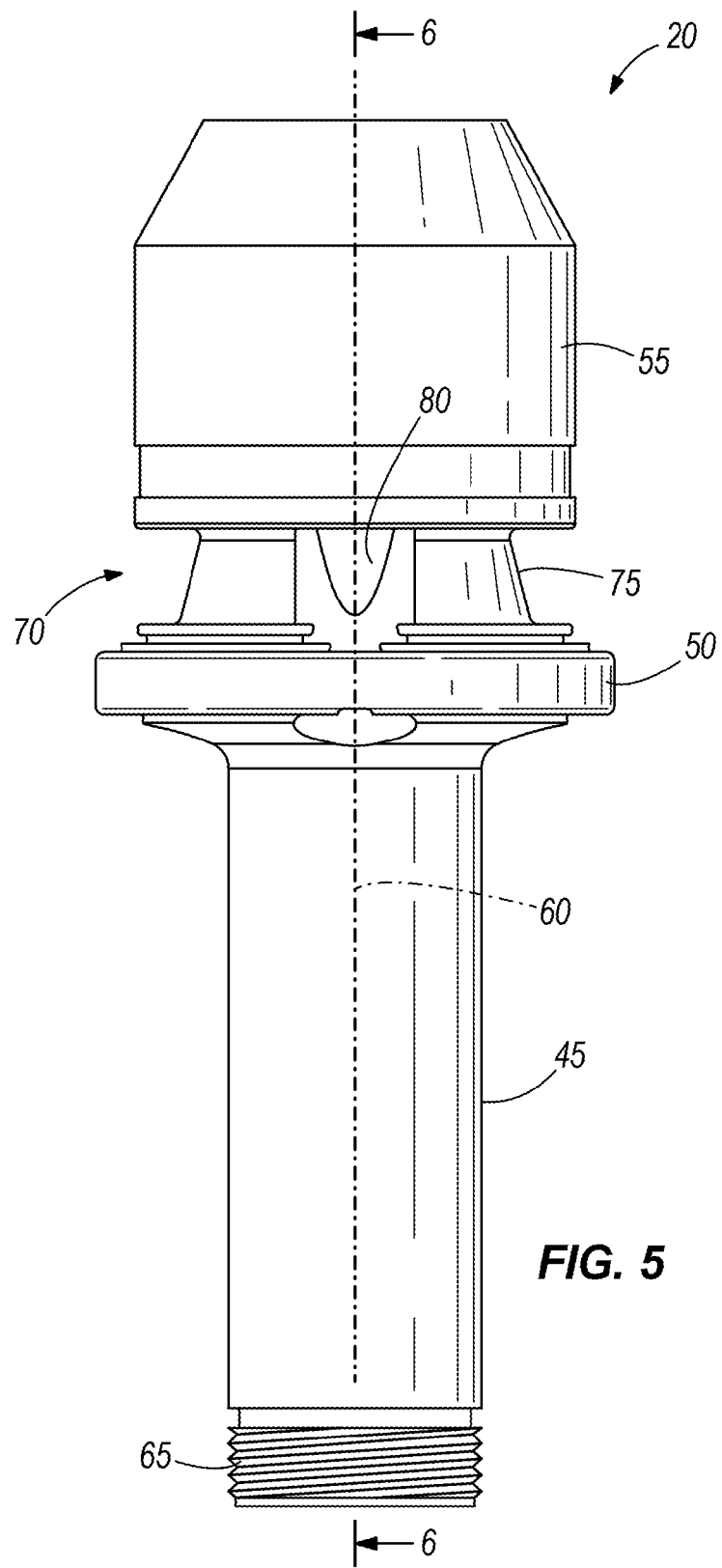
FIG. 5 is a side view of the chuck body of FIG. 4.
Figure 6:
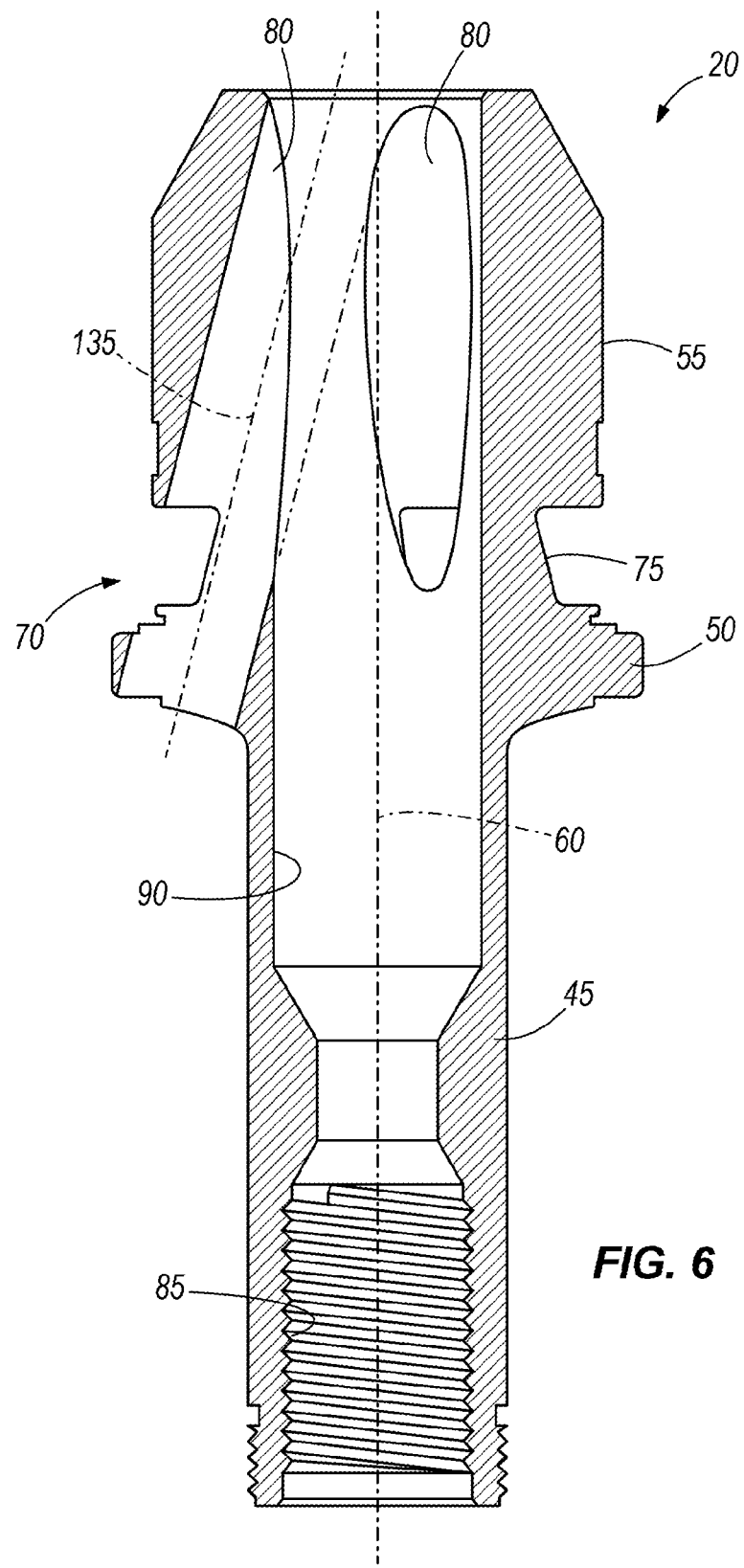
FIG. 6 is a section view of the chuck body of FIG. 4 taken along a plane through the longitudinal axis of the chuck body.

FIGS. 4-6 illustrate the chuck body 20 which includes a shaft portion 45, a collar portion 50, and a head portion 55. The shaft portion 45 extends along a longitudinal axis 60 and includes external threads 65 arranged to threadably engage the threaded aperture 35 of the bottom cover 15 to attach the bottom cover 15 to the chuck body 20. The collar portion 50 and the head portion 55 cooperate to define a slot 70 therebetween. The slot 70 includes a tapered surface 75 that extends a portion of the way between the collar portion 50 and the head portion 55.

In the illustrated construction, three jaw apertures 80 extend through the collar portion 50 and into the head portion 55. Each of the apertures 80 is spaced about 120 degrees from the adjacent two apertures 80 and is angled at about 15 degrees with respect to the longitudinal axis 60. As one of ordinary skill in the art will realize, additional apertures 80 or fewer apertures 80 could be used if desired. In addition, different angular spacing and a different angle with respect to the longitudinal axis 60 could be employed if desired.

FIG. 6 illustrates the interior of the chuck body 20 which includes a threaded bore 85 and a central bore 90 extending from the threaded bore 85. The threaded bore 85 includes threads that are sized and arranged to attach the chuck 10 to a power tool or other device for use. As illustrated in FIG. 3, the three jaw apertures 80 extend through the collar portion 50 and into the central bore 90 within the head portion 55.

With reference to FIGS. 1 and 2, the sliding assembly 25 includes a guide sleeve 95, three jaws 100, three jaw pins 105, and a biasing member 110. As illustrated in FIG. 2, the biasing member 110 includes a compression spring disposed between the guide sleeve 95 and the bottom cover 15 and arranged to bias the guide sleeve 95 away from the bottom cover 15. It should be noted that the invention is described as including three jaws 100 and three jaw pins 105. However, other constructions may use fewer jaws 100 or more jaws 100, thereby requiring fewer or more jaw pins 105. Thus, the invention should not be limited to constructions that employ only three jaws 100.

Figure 7:
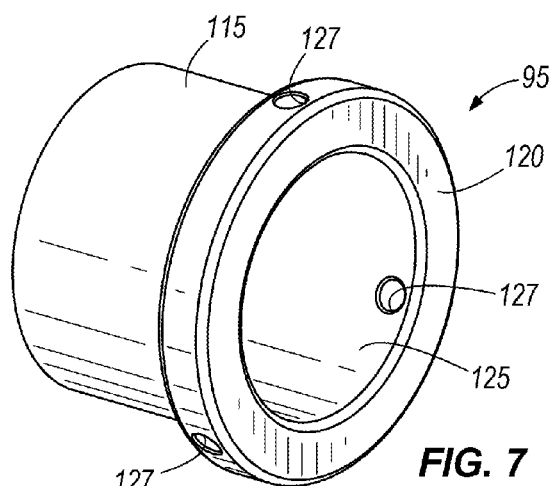
FIG. 7 is a perspective view of a guide sleeve.

The guide sleeve 95, illustrated in FIG. 7 includes a cylindrical portion 115 and a collar 120 disposed at one end of the cylindrical portion 115. A bore 125 extends through the cylindrical portion 115 and is sized to allow the guide sleeve 95 to slide along the shaft portion 45 of the chuck body 20. The collar portion 120 extends around one end of the cylindrical portion 115 and provides a surface that engages one end of the biasing member 110. Three apertures 127 extend radially into the collar 120 and are sized to receive the jaw pins 105.

Figure 8:
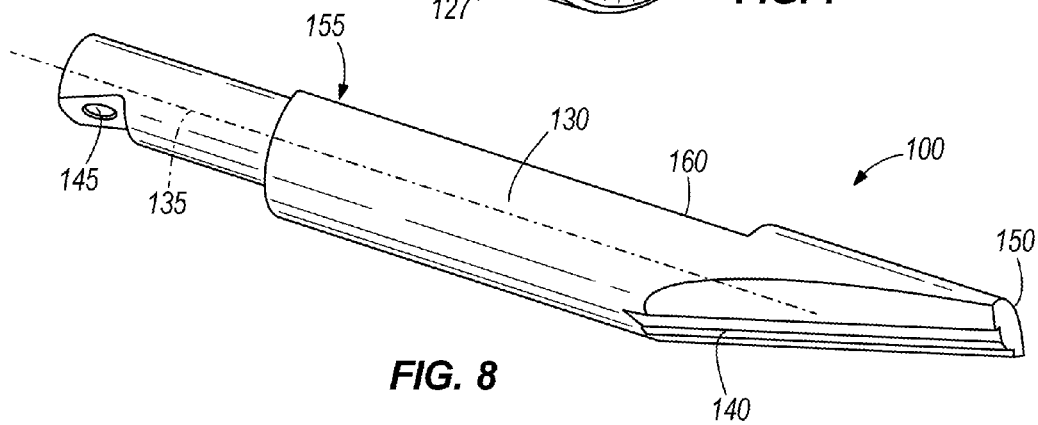
FIG. 8 is a perspective view of a jaw.

FIG. 8 illustrates one of the jaws 100. Each jaw 100 includes a body 130 that extends along a jaw axis 135 and includes an engaging surface 140 at one end and a pin aperture 145 near the opposite end. The pin aperture 145 is sized to receive the jaw pin 105 such that the jaw 100 is free to slide along the jaw pin 105. The engaging surface 140 is angled with respect to the jaw axis 135 at an angle that is about equal to the angle of the jaw apertures 80 with respect to the longitudinal axis 60. Thus, in the illustrated construction, the engaging surface 140 is angled at about 15 degrees with respect to the jaw axis 135. This arrangement assures that the engaging surface 140 remains substantially parallel to the longitudinal axis 60 at all positions. A guide surface 150 is formed opposite the engaging surface 140 and is contoured to engage the central bore 90 of the chuck body 20 to guide the movement of the jaw 100 along the longitudinal axis 60. A recessed surface 155 extends from the guide surface 150 to the second end of the jaw 100 and includes a threaded portion 160.

Figure 9:
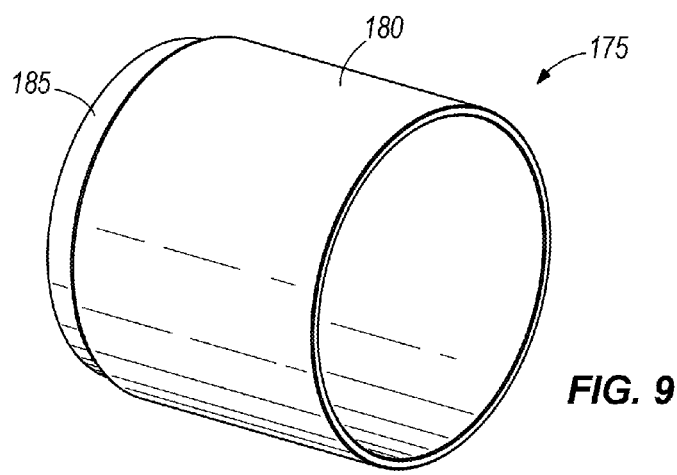
FIG. 9 is a perspective view of a sleeve.

The rotating assembly 30 includes a split ring 165, a collar 170, and a sleeve 175 that rotate together about the longitudinal axis 60. The sleeve 175, illustrated in FIG. 9 includes a first cylindrical wall 180 and a second smaller diameter cylindrical wall 185 that cooperate to form a hollow tube-like member. The smaller diameter cylindrical wall 185 is sized to fit within the bottom cover 15 and engages the cover 15 such that the sleeve 175 is rotatable with respect to the bottom cover 15 but is not movable along the longitudinal axis 60 with respect to the bottom cover 15. In another construction, the bottom cover 15 and the sleeve 175 are fixedly attached to one another such that both components rotate in unison about the longitudinal axis 60.

Figure 10:
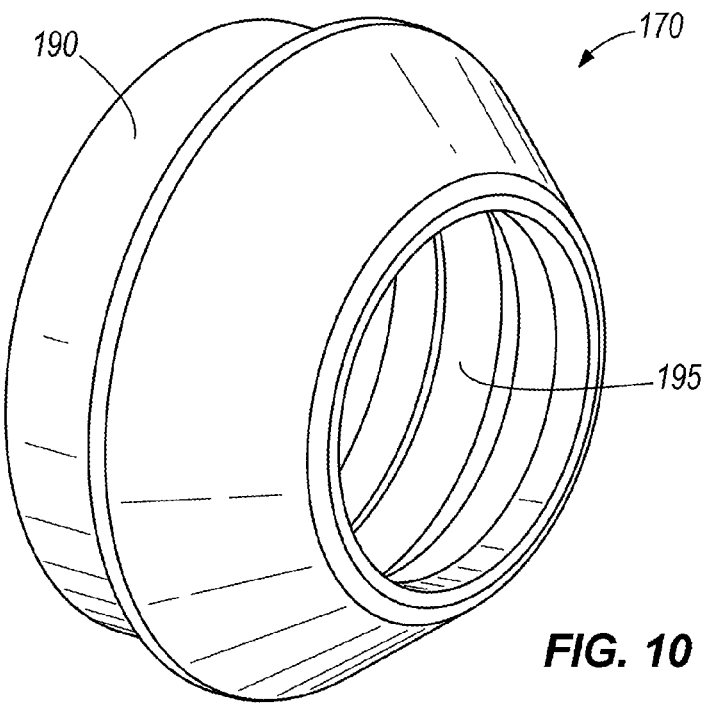
FIG. 10 is a perspective view of a collar.

As illustrated in FIG. 10, the collar 170 includes a cylindrical outer wall 190 sized to fit within the first cylindrical wall 180 of the sleeve 175 to couple the sleeve 175 and the collar 170 for rotation. The collar 170 also includes an interior surface 195 that is sized and shaped to inhibit radial movement of the split ring 165 and to hold the split ring 165 in its operating position. In some constructions, the collar 170 includes two or more key members (not shown) that extend along an axis that is parallel to the longitudinal axis 60.

Figure 11:
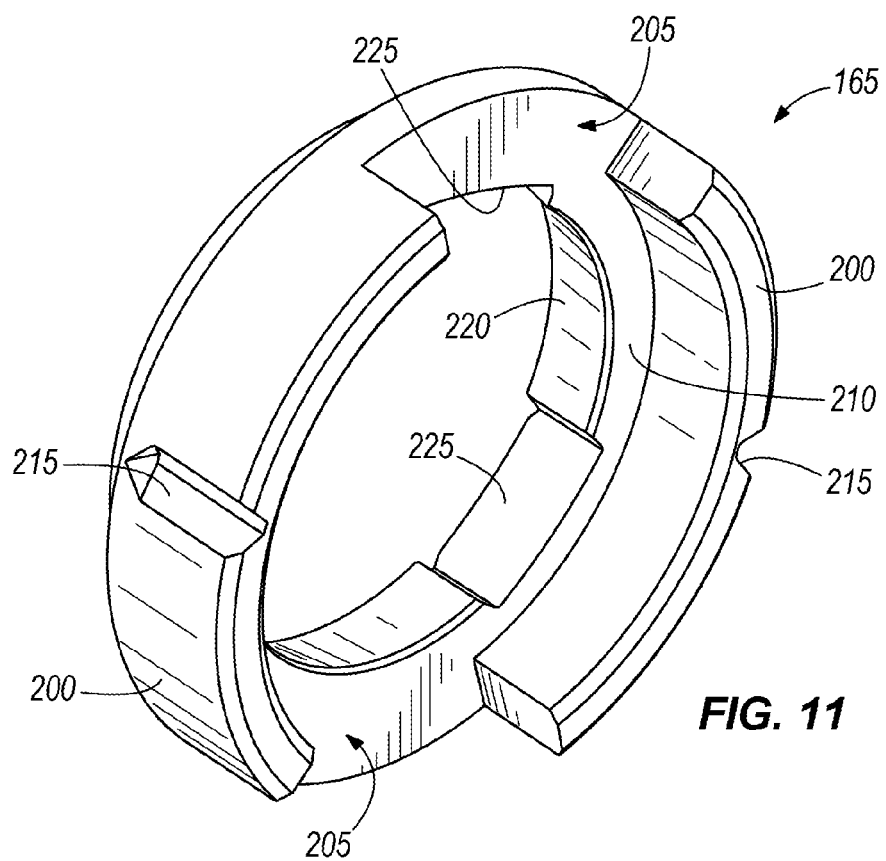
FIG. 11 is a perspective view of a split ring.

Turning to FIG. 11, the split ring 165 is illustrated as a single unitary component. However, the split ring 165 is preferably formed from two identical or similar half rings that when put together define the complete split ring 165. The split ring 165 includes two cylindrical wall portions 200 that are separated by gaps 205 and that extend from a second cylindrical portion 210. In some constructions, two or more key slots 215 are formed in the cylindrical wall portions 200. A tapered bore defines the innermost surface 220 of the second cylindrical portion 210. The innermost surface 220 is angled such that it is substantially parallel to the jaw aperture 80 when sectioned through the longitudinal axis 60 and the jaw axes 135. The innermost surface 220 includes threads that are arranged to engage the threads of each of the three jaws 100. In addition, the second cylindrical portion 210 includes three jaw recesses 225 that extend radially outward from the innermost surface 220 and that are sized to receive the jaws 100.

To assemble the chuck 10, the jaws 100 are positioned within the jaw apertures 80 of the chuck body 20. The guide sleeve 95 is slid onto the chuck body 20 and the jaw pins 105 are slid through the pin apertures 145 in each of the jaws 100 and into their respective guide sleeve apertures 127. The two halves of the split ring 165 are positioned within the slot 70 between the collar portion 50 and the head portion 55 of the chuck body 20. The collar 170 is then slid over the head portion 55 of the chuck body 20 and into position such that the interior surface 195 of the collar 170 holds the split ring 165 together. In constructions that include key members on the collar 170, the key members are aligned with the key slots 215 in the split ring 165 to fixedly tie the collar 170 and the split ring 165 for rotation. The sleeve 175 is then attached to the collar 170 and the biasing member 110 is positioned such that one end engages the guide sleeve 95. The bottom cover 15 is then threaded onto the chuck body 20 to compress the biasing member 110 and complete the assembly of the chuck 10.

In operation, the biasing member 110 biases the sliding assembly 25 upward such that the jaws 100 are in their closed or smallest size position (the close position), as illustrated in FIG. 2. To insert a bit or other tool, the user first rotates the rotating assembly 30 via the collar 170 and the sleeve 175 to a free moving position. In this position, the recesses 225 of the split ring 165 are aligned with the jaws 100 such that the threads of the jaws 100 are disengaged from the threads of the split ring 165. With the threads disengaged, the only resistance to downward movement of the jaws 100 (i.e., toward the open position) is provided by the biasing member 110. Thus, the user pushes the jaws 100 downward such that the jaws 100 are free to open and receive the tool being inserted. Once the tool is inserted, the biasing member 110 biases the jaws 100 upward slightly and the central bore 90 guides the jaws 100 inward slightly to lightly squeeze the tool. The user then rotates the rotating assembly 30 to rotate the split ring 165. As the split ring 165 rotates, the tapered threads of the split ring 165 engage the threads of the jaws 100. The thread pitch is arranged such that further rotation of the rotating assembly 30 forces the jaws 100 upward and inward (i.e., toward the close position) to firmly hold the tool in place. Thus, a user is able to quickly insert a tool into the chuck 10 with very little rotation of the rotating assembly 30. To remove the tool, the user simply rotates the rotating assembly 30, in the opposite direction, to the free moving position to disengage the threads of the split ring 165 from the threads of the jaws 100. The user then simply pulls the tool from the chuck 10. With the tool removed, the biasing member 110 biases the jaws 100 to their closed or smallest size position.

Figure 12:
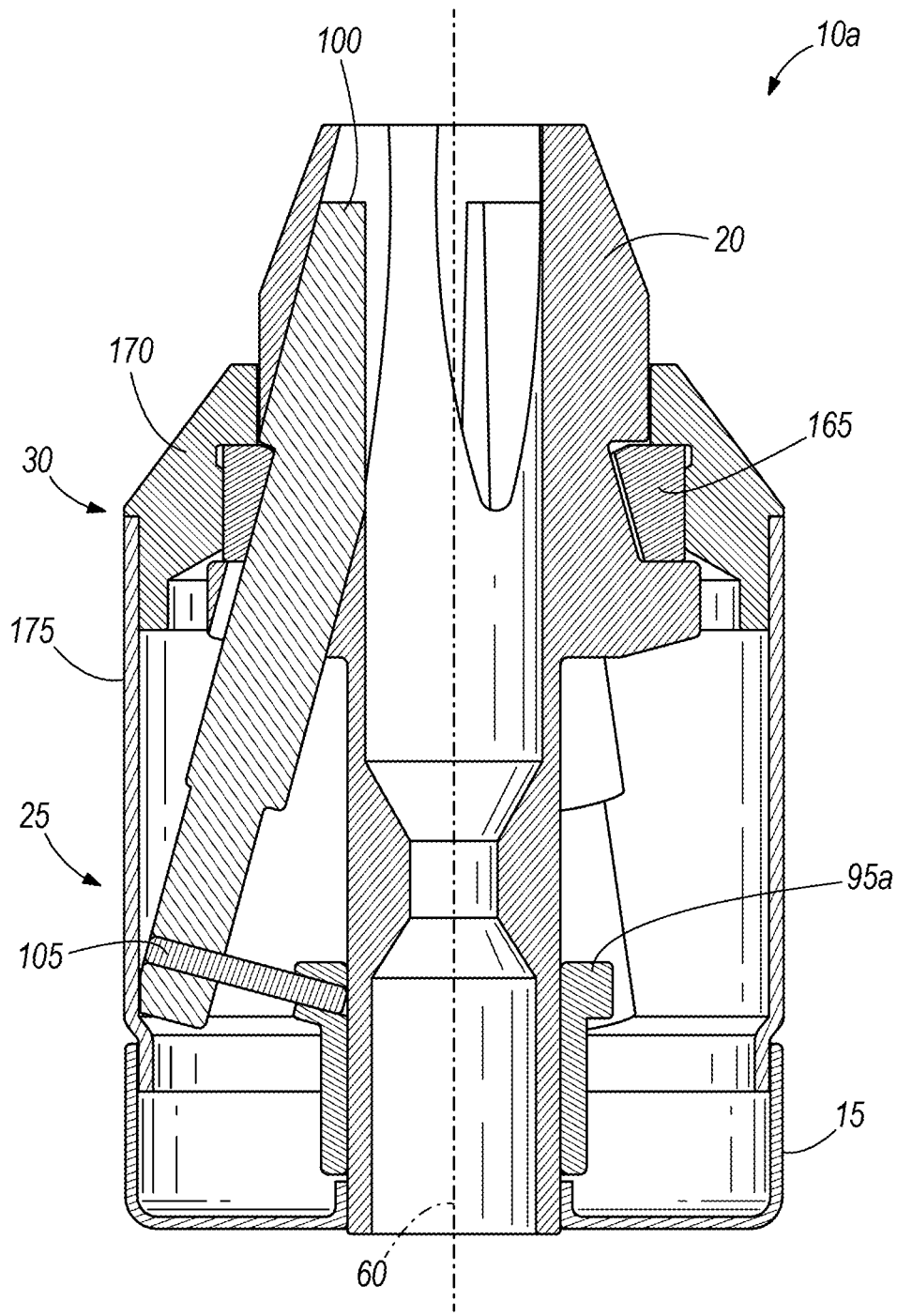
FIG. 12 is a broken away view of another auto sizing chuck in a first position.

FIG. 12 illustrates another auto sizing chuck 10a that is similar to the auto sizing chuck 10 of FIG. 1. The auto sizing chuck 10a includes a plurality of pins 105 that each engages a jaw 100a and a guide sleeve 95a. Rather than orient the pins 105 so that they are normal to the direction of movement of the guide sleeve 95, 95a as they are oriented in FIG. 1, the pins 105 in FIG. 12 are oriented so that they are approximately normal to the jaw 100a that the pin 105 engages. This arrangement assures that the jaws 100a do not apply an uneven load to the pins 105 during movement, as such a load could cause binding or sticking during auto sizing operation.

We claim:

1. A chuck for a power tool, the chuck comprising:
   a chuck body extending along a longitudinal axis and defining an attachment end and a tool receiving end, the chuck body including a plurality of slots each arranged at an oblique angle with respect to the longitudinal axis;
   a plurality of jaws each including a first engagement portion, a jaw end, and a drive end, each of the jaws disposed within one of the plurality of slots and movable between a close position and an open position, the plurality of jaws and the chuck body cooperating to radially define a biasing space disposed radially between the drive ends of the jaws and the chuck body;
   a biasing member coupled to the plurality of jaws and operable to bias the plurality of jaws toward the close position, the biasing member including a guide sleeve and a spring disposed radially within the biasing space; and
   a cap separate from the chuck body and coupled to the attachment end of the chuck body;
   a rotating assembly selectively engageable with the plurality of jaws such that when engaged, the plurality of jaws are movable in response to rotation of the rotating assembly.

2. The chuck of claim 1, wherein the rotating assembly includes a second engagement portion selectively engageable with each of the plurality of jaws.

3. The chuck of claim 2, wherein the first engagement portion includes threads formed on a surface of each of the jaws.

4. The chuck of claim 3, wherein the second engagement portion includes threads adapted to engage the threads of the jaws.

5. The chuck of claim 1, wherein the guide sleeve is coupled to each of the plurality of jaws and is movable axially along the longitudinal axis, each of the plurality of jaws moving along a jaw axis that is oblique with respect to the longitudinal axis in response to movement of the guide sleeve.

6. The chuck of claim 5, further comprising a plurality of pins, each pin fixedly attached to the guide sleeve and movably attached to one of the plurality of jaws such that the jaw moves along the pin as it moves between the close position and the open position.

7. The chuck of claim 6, wherein each of the pins defines a longitudinal pin axis and each of the longitudinal pin axes is substantially normal to the longitudinal axis.

8. The chuck of claim 6, wherein each of the pins defines a longitudinal pin axis and each of the longitudinal pin axes is substantially normal to the jaw axis of the jaw to which the pin attaches.

9. The chuck of claim 1, wherein the chuck body includes a plurality of jaw receiving surfaces and each of the plurality of jaws includes a guide surface engaged with one of the jaw receiving surfaces to guide movement of the jaw along a jaw axis that is oblique with respect to the longitudinal axis.

10. A chuck for a power tool, the chuck comprising:
    a chuck body extending along a longitudinal axis and defining an attachment end and a tool receiving end, the chuck body including a plurality of slots each arranged at an oblique angle with respect to the longitudinal axis and a cylindrical guide surface having an outer diameter;
    a cap separate from the chuck body and coupled to the attachment end of the chuck body;
    a plurality of jaws each including a first engagement portion, a jaw end, and a drive end, the drive end defining an inside diameter, each of the jaws disposed within one of the plurality of slots and movable between a close position and an open position;
    a biasing member coupled to the plurality of jaws and operable to bias the plurality of jaws toward the close position, the biasing member including a guide sleeve that movably engages the cylindrical guide surface and a spring, each of the guide sleeve and the spring positioned radially between the outer diameter and the inside diameter; and
    a rotating assembly coupled to the chuck body and including a second engagement portion, the rotating assembly rotatable with respect to the chuck body between a disengaged position, an engaged position, and a tightened position, wherein the first engagement portions and the second engagement portion are disengaged when the rotating assembly is in the disengaged position such that the plurality of jaws are movable along the longitudinal axis independent of the rotating assembly and wherein the first engagement portions and the second engagement portion are engaged when the rotating assembly is in the engaged position such that the plurality of jaws are movable along the axis in response to rotation of the rotating assembly, and wherein rotation of the rotating assembly from the engaged position to the tightened position moves the plurality of jaws toward the close position.

11. The chuck of claim 10, wherein the first engagement portion includes threads formed on a surface of each of the jaws.

12. The chuck of claim 11, wherein the second engagement portion includes threads adapted to engage the threads of the jaws.

13. The chuck of claim 10, wherein the guide sleeve is coupled to each of the plurality of jaws and is movable axially along the longitudinal axis, each of the plurality of jaws moving along a jaw axis that is oblique with respect to the longitudinal axis in response to movement of the guide sleeve.

14. The chuck of claim 13, further comprising a plurality of pins, each pin fixedly attached to the guide sleeve and movably attached to one of the plurality of jaws such that the jaw moves along the pin as it moves between the close position and the open position.

15. The chuck of claim 14, wherein each of the pins defines a longitudinal pin axis and each of the longitudinal pin axes is substantially normal to the longitudinal axis.

16. The chuck of claim 14, wherein each of the pins defines a longitudinal pin axis and each of the longitudinal pin axes is substantially normal to the jaw axis of the jaw to which the pin attaches.

17. The chuck of claim 10, wherein the chuck body includes a plurality of jaw receiving surfaces and each of the plurality of jaws includes a guide surface engaged with one of the jaw receiving surfaces to guide movement of the jaw along a jaw axis that is oblique with respect to the longitudinal axis.

\* \* \* \* \*